July 19, 1955   A. E. TILLEY   2,713,620
AUTOMATIC VOLUME CONTROL SYSTEM
Filed April 29, 1949
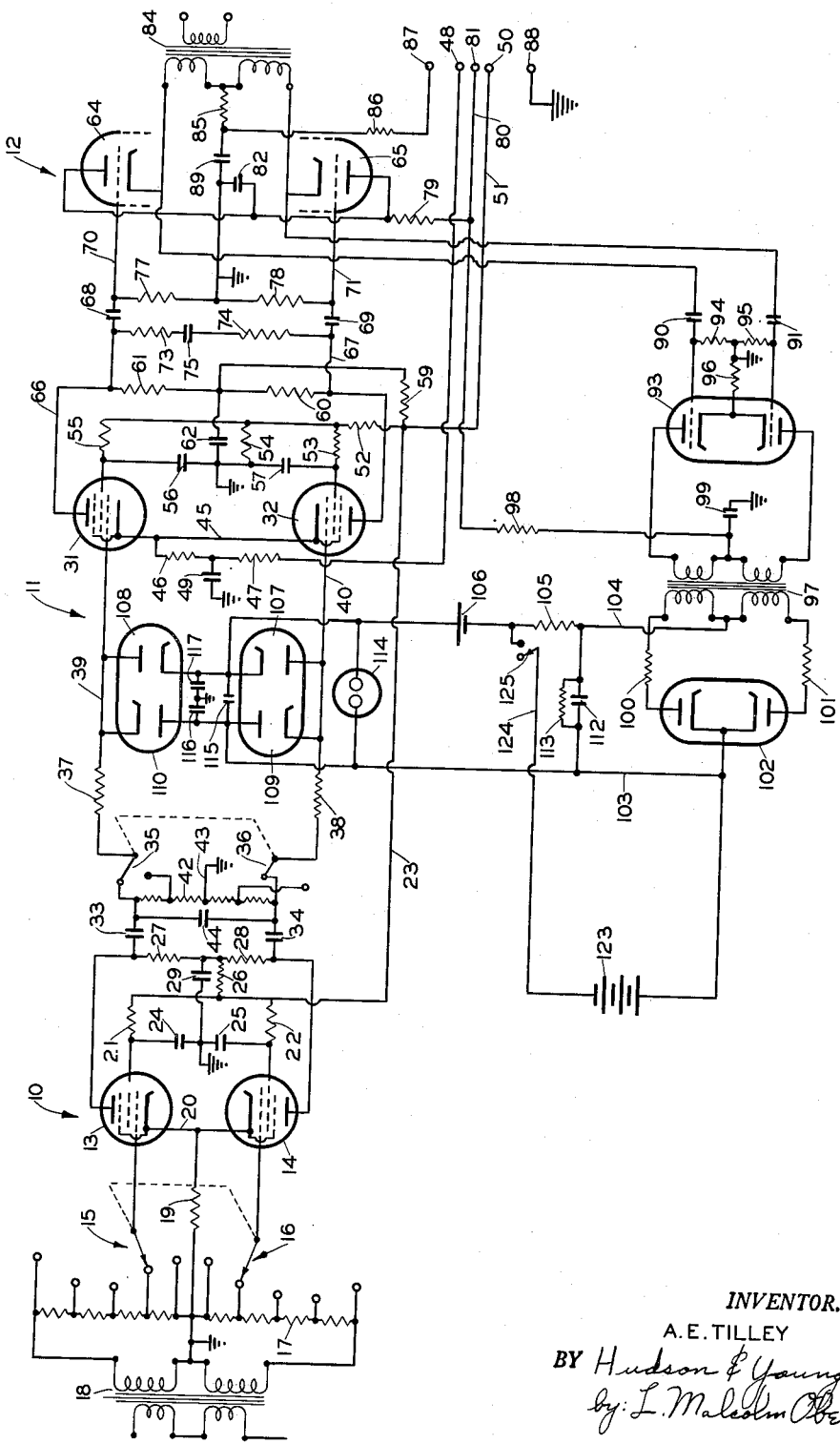
INVENTOR.
A. E. TILLEY
BY Hudson & Young
by: L. Malcolm Oberlin
ATTORNEYS

United States Patent Office 2,713,620
Patented July 19, 1955

2,713,620

AUTOMATIC VOLUME CONTROL SYSTEM

Aubra E. Tilley, Bartlesville, Okla., assignor to Phillips Petroleum Company, a corporation of Delaware Application April 29, 1949, Serial No. 90,479

5 Claims. (Cl. 179—171)

This invention relates to an amplifier embodying an improved automatic volume control system.

In geophysical prospecting, an explosive charge is detonated at a predetermined location, referred to as the shot point, and this detonation produces seismic waves which are reflected from subterranean strata and impinge on mechano-electric transducers, such as seismometers, which are disposed at predetermined locations spaced from the shot point. The electrical voltages produced by the seismometers are representative of the seismic waves incident upon the seismometers and these voltages are amplified and individually recorded, thereby furnishing valuable information regarding the structure of the subterranean strata. The electrical signals produced by the seismometers are of very low amplitude and it is necessary that they be substantially amplified in order to properly operate the recording device. The first signals reaching the seismometers after detonation of the explosive charge are relatively strong whereas latter signals rapidly decrease in amplitude. Accordingly, seismic amplifiers are ordinarily provided with an automatic volume control system so that the amplifier output is maintained within proper amplitude limits to produce useable traces upon the recording medium. Such an amplifier should have a minimum frequency discrimination for signals within a frequency range of about 2 to 200 cycles per second, as the components of interest in the seismic signals lie within this frequency range. This produces difficulties in suitably controlling the amplifier by an automatic volume control system, since said system must have a time constant different from the frequency of signals fed to the amplifier but, nevertheless, a rapid action is necessary due to the relatively short time interval in which the seismic signals are received.

In accordance with the present invention, this result is achieved by the use of push-pull amplification in which an automatic volume control voltage is utilized to vary the impedance of a double set of rectifier elements connected between the control grids of the tubes in a push-pull stage of the amplifier. In this manner, the control pulse produced by the automatic volume control system is applied to the amplifier without causing oscillation thereof and the control pulse is removed from the amplifier output by the use of degeneration in the subsequent amplifier stages so that the bias on the subsequent amplifier tubes is not disturbed despite considerable variations in the input signals fed to such tubes.

It is an object of the invention to produce an improved automatic volume control system particularly adapted for use in seismic amplifiers.

It is a further object of the invention to produce an amplifier in which rapid control is effected by the automatic volume control system without causing oscillation or distortion of the amplifier output.

It is a still further object of the invention to provide apparatus which is reliable in operation, and which utilizes a minimum number of standard circuit components.

Various other objects, advantages and features of the invention will become apparent to one skilled in the art from the accompanying disclosure and drawing, in which the figure is a schematic circuit diagram of a seismic amplifier embodying the novel automatic volume control circuit.

Referring now to the drawing in detail, the amplifier of this invention comprises first and second stages 10, 11 of audio amplification followed by a power amplifier stage 12. Amplifier stage 10 includes a pair of pentode tubes 13 and 14, the control grids of which are connected through ganged switches 15, 16 to opposite terminals of a resistance network 17, this network being connected across a split secondary winding of an input transformer 18. The grounded center tap of the secondary winding is connected to the center of impedance network 17, and through a resistor 19 to a lead 20 which interconnects the cathodes of tubes 13 and 14. Accordingly, input signals applied to the primary winding of transformer 18 are applied to the control grids of amplifier tubes 13, 14 at a level dependent upon the setting of switches 15, 16. The suppressor grids of tubes 13 and 14 are connected to the respective cathodes of the tubes and the screen grids are connected through isolating resistors 21, 22 to a positive power supply conductor 23. The screen grids are also provided with grounded by-pass condensers 24 and 25. Operating potentials are supplied to the anodes of tubes 13, 14 by a network which includes resistances 26, 27, 28 and a by-pass condenser 29.

The anodes of tubes 13, 14 are resistance-capacitance coupled to the respective control grids of a pair of pentode tubes 31, 32. To this end, the anodes of tubes 13, 14 are connected through coupling condensers 33 and 34, switch sections 35 and 36, series resistances 37 and 38, and leads 39, 40 to the respective control grids of tubes 31 and 32. Switch sections 35, 36 are shunted by a two-section resistance network 42 having a grounded center tap 43, this resistance network being shunted by a condenser 44.

In accordance with the invention, the cathodes of tubes 31, 32 are interconnected by a lead 45 and this lead, in turn, is connected through a degenerating resistor 46 and a resistor 47 to a negative terminal 48 of a bias voltage source. The junction between resistors 46 and 47 has a grounded by-pass condenser 49 connected thereto. The suppressor grids of the respective pentodes 31 and 32 are grounded, and operating potential is supplied to the screen grids of these tubes from a positive power supply terminal 50 through a lead 51 and a network including resistances 52, 53, 54, 55 and by-pass condensers 56, 57, the lead 51 being connected to lead 23 which supplies operating potentials to the anodes and screen grids of tubes 13 and 14. Operating potential is supplied to the anodes of tubes 31, 32 from conductor 51 by a network which includes resistances 59, 60, 61, and a by-pass condenser 62.

The anodes of tubes 31, 32 are resistance-capacitance coupled to the control grids of a dual triode power amplifier tube 64 and 65. To this end, the respective anodes of tubes 31, 32 are connected by leads 66 and 67, coupling condenser 68, 69, and leads 70, 71 to the control grids of tubes 64 and 65. A network including a pair of resistances 73, 74 and a series condenser 75 is shunted across leads 66, 67 and a pair of grid resistors 77, 78 interconnects the respective control grids of tubes 64, 65 and ground. The anodes of tubes 64, 65 are connected through a resistance 79 and a lead 80 to a positive power supply terminal 81, and the anodes are further provided with a grounded by-pass condenser 82. The cathodes of tubes 64, 65 are connected, respectively, to opposite terminals of a split primary winding of an output transformer 84, the center tap of which is connected through a degenerating resistor 85 and a resistor 86 to a negative terminal 87 of a bias voltage source. The power supply unit also includes a ground terminal 88. A grounded by-pass condenser 89 is connected to the junction between resistances 85, 86 and the secondary winding of transformer 84 is connected to a suitable transducing or recording device, to make a record of the amplified signals produced by the amplifier unit.

In accordance with the invention, the output signal of the amplifier is rectified and applied to a variable impedance connected between the control grids of tubes 31, 32 in such fashion as to vary the gain of these tubes in accordance with the amplitude of the amplifier output signal. To this end, the cathodes of tubes 64, 65 are connected through coupling condensers 90, 91 to the control grids of a dual triode amplifier tube 93. The tube 93 is provided with grid resistors 94, 95 and a bias resistor 96. The anodes of tube 93 are connected to the respective terminals of a split primary winding of a transformer 97, the center tap of which is connected to power supply terminal 81 through a resistance 98 and to ground through a filter condenser 99. Transformer 97 has a split secondary winding, the opposite terminals of which are connected through resistances 100, 101 to the respective anodes of a dual diode tube 102. The cathodes of tubes 102 are interconnected by a conductor 103 and a conductor 104 is connected to the center tap of the secondary winding of transformer 97. Accordingly, it will be apparent that the output voltage of the main amplifier is further amplified by tube 93 and rectified by tube 102, the rectified voltage appears across conductors 103 and 104. Conductor 104 is connected through a resistance 105 and a battery 106 to the cathodes of a set of diodes 107 and 108, the anodes of which are connected to the respective control grids of tubes 31 and 32. Lead 103 is connected to the anodes of a set of diodes 109 and 110, the cathodes of which are connected to the respective control grids of tubes 31 and 32. For convenience, diodes 107, 109 and 108, 110 may be mounted within a common envelope. Conductors 103, 104 are interconnected by a unit including a condenser 112 shunted by a resistor 113, by a voltage regulator tube 114, by a condenser 115, and by a pair of series connected condensers 116, 117, the junction between the latter condensers being grounded.

When a seismic signal is applied to the input transformer 13, it is amplified by push-pull stages 10, 11 and 12, after which the amplified signal appears at the secondary winding of transformer 84. A portion of the signal voltage is amplified by tube 93 and rectified by tube 102, this voltage causing a current to circulate through the diodes 107, 109 and 108, 110. This circulating current changes the impedance of the diode circuits and, when the signal rises above a predetermined amplitude, the impedance across the control grids of tubes 31, 32 is decreased thereby to decrease the amplifier gain and restore the signal amplitude to its predetermined value. The time required for the gain to be reduced in this manner depends on the time constants of the resistance-capacitance units connected in the diode circuits. When the signal amplitude decreases, the rectified voltage from tube 102 also decreases with the result that the current circulating in the diodes 107, 109 and 108, 110 is decreased thereby increasing the impedance appearing between the grids of tubes 31, 32 and increasing the amplifier gain. Preferably, the resistance of units 37, 38 is high as compared with that of the tubes 108, 110 and 107, 109 so that changes in impedance of these tubes do not appreciably affect the output impedances of tubes 13 and 14. Thus, the resistor 37, in effect, forms a potentiometer with tubes 108 and 110. The resistors 37, 38 may be omitted if amplifier stage 10 or other signal source is of the constant current type.

As previously stated, when seismic signals are recorded, their amplitude is substantially higher at the beginning of the recording period than at the end of the recording period. In order to minimize the magnitude of the necessary gain changes produced by amplifier tubes 93 and 102, I apply a second control voltage across the conductors 103, 104 of proper polarity as to substantially reduce the amplifier gain at the beginning of the recording period and thereafter gradually increase the amplifier gain during the remainder of the recording period. In this manner, the second control voltage produces an increase in amplifier gain during the recording period which approximately compensates for the decrease in signal amplitude, and the relative small additional adjustments necessary to maintain the output amplitude at a substantially constant level are made by control voltage produced by the tubes 93 and 102.

A simplified circuit for producing this result is shown by the figure as including a battery 123 which is connected to conductors 103, 104 by a switch 125. Switch 125 is closed before the recording period starts with the result that battery 123 charges condenser 112. When the recording period is initiated, switch 125 is moved to its open position, with the result that the condenser 112 applies a control voltage across conductors 103, 104 of such polarity as to substantially reduce the amplifier gain. During the recording period, condenser 112 discharges through resistor 113 thereby progressively decreasing the control voltage applied across conductors 103, 104 with the result that the amplifier gain is progressively increased throughout the recording period. An auxiliary resistance or capacitance may be switched into and out of the circuit to selectively change the time constant of circuit 112 and 113, if desired. Although the circuit disclosed functions satisfactorily, it is desirable in some instances to utilize a more elaborate circuit, such as that shown by my copending application, Serial No. 90,478, filed April 29, 1949, now Patent 2,591,637, issued April 1, 1952, entitled "Automatic Volume Control Circuit." Switch 125 may be actuated automatically when an explosive charge is detonated at a shot point to cause proper application of the control voltage. A suitable circuit for obtaining this result is shown by U. S. Patent 2,470,846 to D. R. de Boisblanc and J. E. Bondurant, entitled "Seismograph Blaster Time Breaker Circuit."

In the present system, a low frequency pulse is created by the action of the automatic volume control voltage upon the diodes 107, 109 and 108, 110. This pulse is removed from the amplifier output and, hence, does not appear at the recording device. To this end, resistor 46 in the cathode circuit of tubes 31, 32 and resistor 85 in the cathode circuits of tubes 64, 65 has an ohmic value substantially higher than that normally encountered where a conventional self-biasing resistor is utilized. Thus, where tubes 31, 32 are of type 6AJ5, resistor 46 may be 39,000 ohms instead of the usual value in the neighborhood of 2,000 or 3,000 ohms. Similarly, where tubes 64, 65 are the two sections of a 12AU7 dual triode, resistor 85 may have a value of 5600 ohms which is substantially higher than the normal value of such a resistor. It will be further noted that resistors 46, 85 are not provided with the usual by-pass condenser connected in shunt therewith. Such a condenser tends to maintain the cathode voltage of the tubes at a constant level, despite changes in the applied grid voltage.

In the present case, considering tubes 31 and 32 as an example, the cathode voltage remains substantially constant when the signal applied to the control grids thereof is within the usual amplitude range. This results from the fact that the tubes are connected in push-pull circuit arrangement so that tube 31 draws anode current while tube 32 does not and vice versa. However, when a voltage of abnormally high amplitude is applied to the control grids of these tubes, tube 32 may be cut off while tube 31 draws an abnormally high anode current. This would normally produce distortion resulting from flow of grid current. However, where the degenerating resistor 46 is utilized, an abnormal current flow through resistor 46 produces an abnormal voltage drop through resistor 46 which tends to maintain the cathode at a higher potential, that is, at a potential substantially equal to that of the control grid. Accordingly, there is no tendency for grid current to flow even when a signal of abnormally high amplitude is applied to the control grid. A similar action occurs when the phase of the input signal is reversed, in which case tube 31 is cut off and tube 32 has its anode maintained at substantially the same potential as the control grid by action of degenerating resistor 46. The negative bias voltage applied to the cathode from terminal 48 also aids in providing the described degenerative action and thus serves to minimize or eliminate distortion resulting from signals of unusually high amplitude. The same degenerating action is produced in power amplifier stage 12 by the action of degenerating resistor 85. It will be understood that the degenerative action described compensates for abrupt increases in signal amplitude which occur too rapidly to be compensated for by the automatic volume control network. The degenerative circuits also function to remove the low frequency pulse created by the automatic volume control voltage acting upon the diode control elements 107, 109 and 108, 110.

By the use of the circuit of this invention, it is readily possible to maintain the galvanometer trace of a recording oscillograph within a practical range despite changes of large magnitude in the amplitude of the incoming seismic signals. The low frequency pulses produced by the action of the automatic volume control circuit are removed without the use of a filter which would substantially attenuate the signal voltages if it had a sufficiently high time constant as to remove the pulse produced by the automatic volume control system. The amplifier is well adapted to study the true movement of the ground in response to seismic disturbances since it has extremely low frequency discrimination within the frequency range between 2 and 200 cycles, this range including the essential frequency components of interest in the seismic waves.

While the invention has been described in accordance with a present, preferred embodiment thereof, it is to be understood that this description is illustrative only and is not intended to limit the invention, the scope of which is defined by the appended claims.

Having described my invention, I claim:

1. An automatic volume control circuit comprising, in combination, a multi-stage amplifier, one stage including a pair of tubes connected in push-pull circuit arrangement, each tube having an anode, a cathode, and a control grid, means for supplying operating potentials to the electrodes of said tubes, means for rectifying a voltage from one of the stages of said multi-stage amplifier, a pair of output terminals for receiving said voltage, a first pair of rectifier devices of the same polarity respectively connecting the control grids of said push-pull stage to one of said terminals, a second pair of rectifier devices of the same polarity respectively connecting the last-mentioned control grids to the other of said terminals, said first pair of rectifier devices being oppositely poled relative to said second pair of rectifier devices, means including a capacitance connected across said terminals and a leakage path of constant resistance for discharging said capacitance, means for charging said capacitance, means for disconnecting said charging means whereby the discharge of said capacitance provides an exponentially-decreasing voltage across said terminals, said decreasing voltage cooperating with said rectified voltage to provide a substantially constant amplitude level and minimizing the magnitude of said rectified voltage necessary to provide such substantially constant amplitude level.

2. An automatic volume control circuit comprising, in combination, a multi-stage amplifier, one stage of said amplifier having two tubes connected in push-pull circuit arrangement, each tube including an anode, a cathode, and a control grid, means for supplying operating potentials to the electrodes of said tubes, means for rectifying an output voltage from an amplifier stage subsequent to said push-pull stage, a pair of terminals for receiving the output voltage of said rectifying means across them, a first pair of diodes having their anodes connected to one of said terminals and having their cathodes connected to the respective control grids of said tubes, a second pair of diodes having their cathodes connected to the other of said terminals and their anodes connected to the respective control grids of said tubes, means for supplying a second control voltage to said terminals of proper polarity to decrease the impedance of the diode circuits connected between said control grids, said last-mentioned means including a condenser connected across said terminals, a leakage path of constant resistance for discharging said condenser, means for charging said condenser, and means for disconnecting said charging means from said condenser, whereby said condenser discharges and produces an exponentially-decreasing voltage across said terminals, said exponentially-decreasing voltage cooperating with said rectified voltage to provide a substantial constant amplitude level for said amplifier and to minimize the amplitude of the rectified voltage necessary to maintain such substantially constant amplitude level.

3. An automatic volume control circuit comprising, in combination, a multi-stage amplifier having a first push-pull stage and a second push-pull stage, each push-pull stage having two tubes connected in push-pull circuit arrangement, each tube including an anode, a cathode, and a control grid, means for supplying operating potentials to the electrodes of said tubes, a resistance-capacitance network coupling the anodes of the first push-pull stage to the control grids of the second push-pull stage, said network including a pair of resistances of high ohmic value interposed in the respective coupling circuits between said last-mentioned anodes and control grids, a pair of terminals, a first pair of rectifier devices of the same polarity respectively connecting the control grids of the second push-pull stage to one of said terminals, a second pair of rectifier devices of the same polarity respectively connecting the last-mentioned control grids to the other of said terminals, said first pair of rectifier devices being oppositely poled relative to said second pair of rectifier devices, the impedance of said rectifier devices being low as compared to the ohmic value of the resistances in said network, a lead connecting the cathodes of the tubes in said second push-pull stage, an unbypassed cathode load resistor connected between said lead and a point at a lower potential than said last-mentioned cathodes, means for rectifying a voltage from an amplifier stage subsequent to the second push-pull stage, and means for applying the rectified voltage to said terminals.

4. An automatic volume control circuit comprising, in combination, a multi-stage amplifier having a first push-pull stage and a second push-pull stage, each push-pull stage having two tubes connected in push-pull circuit arrangement, each tube including an anode, a cathode, and a control grid, means for supplying operating potentials to the electrodes of said tubes, a resistance-capacitance network coupling the anodes of the first push-pull stage to the control grids of the second push-pull stage, said network including a pair of resistances of high ohmic value interposed in the respective coupling circuits between said last-mentioned anodes and control grids, a pair of terminals, a first pair of diodes having their anodes connected to one of said terminals and having their cathodes connected to the respective control grids of the tubes in said second push-pull stage, a second pair of diodes having their cathodes connected to said other terminal and their anodes connected to said respective control grids, the impedance of said diodes being low as compared to the ohmic value of the resistance in said network, a condenser connected across said terminals, a fixed resistance connected in shunt with said condenser, a switch, a current source, leads connecting the last-mentioned condenser and resistance in circuit with said switch and said current source, whereby opening of said switch allows the condenser to discharge, thereby producing exponentially-decreasing voltage across said terminals, means for rectifying a voltage from one stage of said multi-stage amplifier, and means for applying the rectified voltage across said terminals, said rectified voltage cooperating with said exponentially-decreasing voltage to maintain a substantial constant amplitude level at the output of said amplifier, the action of said condenser minimizing the amplitude of the rectified voltage necessary to maintain said substantially constant amplitude level.

5. An automatic volume control circuit comprising, in combination, a multi-stage amplifier having a first push-pull stage and a second push-pull stage, each push-pull stage having two tubes connected in push-pull circuit arrangement, each tube including an anode, a cathode, and a control grid, means for supplying operating potentials to the electrodes of said tubes, a resistance-capacitance network coupling the anodes of the first push-pull stage to the control grids of the second push-pull stage, said network including a pair of resistances of high ohmic value interposed in the respective coupling circuits between said last-mentioned anodes and control grids, a pair of terminals, a first pair of rectifier devices of the same polarity respectively connecting the control grids of the second push-pull stage to one of said terminals, a second pair of rectifier devices of the same polarity respectively connecting the last-mentioned control grids to the other of said terminals, said first pair of rectifier devices being oppositely poled relative to said second pair of rectifier devices, the impedance of said rectifier devices being low as compared to the ohmic value of the resistances in said network, a lead connecting the cathodes of the tubes in said second push-pull stage, an unbypassed cathode load resistor connected between said lead and a point at a lower potential than said last-mentioned cathodes, means for rectifying a voltage from one of the stages of said amplifier, and means for applying the rectified voltage to said terminals.

References Cited in the file of this patent

UNITED STATES PATENTS

| | | |
|---|---|---|
| 1,990,055 | Timmer | Feb. 5, 1935 |
| 2,098,370 | Bartels | Nov. 9, 1937 |
| 2,143,056 | Curtis | Jan. 10, 1939 |
| 2,144,995 | Pulvari-Pulvermacher | Jan. 24, 1939 |
| 2,156,622 | Doba, Jr. | May 2, 1939 |
| 2,182,329 | Wheeler | Dec. 5, 1939 |
| 2,213,034 | Barney et al. | Aug. 27, 1940 |
| 2,316,354 | Moritz, Jr. | Apr. 13, 1943 |
| 2,329,558 | Scherbatskoy | Sept. 14, 1943 |
| 2,352,825 | Fay | July 4, 1944 |
| 2,390,850 | Singer | Dec. 11, 1945 |
| 2,480,511 | Schade | Aug. 30, 1949 |
| 2,533,253 | Howard | Dec. 12, 1950 |
| 2,554,905 | Hawkins et al. | May 29, 1951 |
| 2,557,888 | Olson | June 19, 1951 |